US006815112B2

(12) United States Patent
Saito et al.

(10) Patent No.: US 6,815,112 B2
(45) Date of Patent: Nov. 9, 2004

(54) FUEL CELL SEPARATOR AND POLYMER ELECTROLYTE FUEL CELL

(75) Inventors: Kazuo Saito, Chiba (JP); Atsushi Hagiwara, Chiba (JP); Koji Banno, Chiba (JP); Ayumi Horiuchi, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 311 days.

(21) Appl. No.: 09/886,382

(22) Filed: Jun. 22, 2001

(65) Prior Publication Data

US 2002/0015876 A1 Feb. 7, 2002

(30) Foreign Application Priority Data

Jun. 23, 2000 (JP) ........................................ 2000-188760

(51) Int. Cl.$^7$ ................................................ H01M 2/00
(52) U.S. Cl. ............................ 429/34; 429/38; 429/39; 429/30; 429/33
(58) Field of Search ............................. 429/34, 38, 39, 429/30, 33

(56) References Cited

U.S. PATENT DOCUMENTS 4,624,811 A * 11/1986 Waitkus et al. ............ 264/29.5
4,631,322 A * 12/1986 Isayama et al. ............. 525/480

FOREIGN PATENT DOCUMENTS

JP            8-222241         8/1996

* cited by examiner

*Primary Examiner*—Bruce F. Bell
(74) *Attorney, Agent, or Firm*—Birch, Stewart, Kolasch & Birch, LLP

(57) ABSTRACT

Disclosed is a fuel cell separator molded from a fuel cell separator composition mainly containing a conductive material and a binder, characterized in that said separator is specified such that after 3.5 g of a test piece cut from said fuel cell separator is put in 305 mL of pure water and the water is heated at 90° C. for 500 hr, an electric conductivity of the water is 50 $\mu$S/cm or less. The fuel cell separator thus obtained is effective to reduce elution of ions and exhibit a high moldability and a high dimensional stability. Further, a polymer electrolyte fuel cell using the fuel cell separators is effective to exhibit a stable output without reduction in output during operation and enhance the operational efficiency.

8 Claims, 3 Drawing Sheets

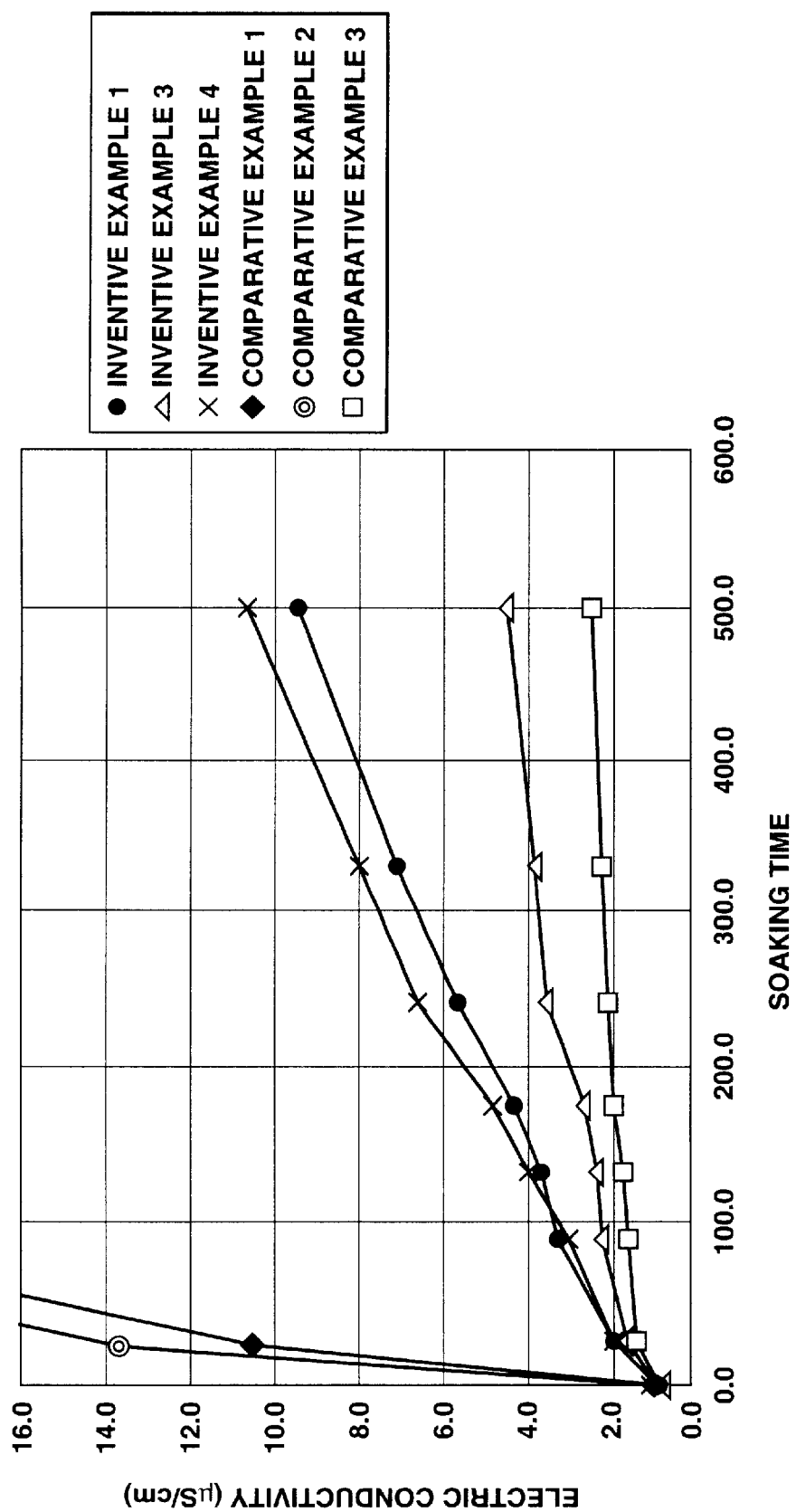

FUEL CELL SEPARATOR AND POLYMER ELECTROLYTE FUEL CELL

BACKGROUND OF THE INVENTION

The present invention relates to a fuel cell separator and a polymer electrolyte fuel cell, and particularly to a high quality fuel cell separator capable of reducing elution of ions and organic matters and exhibiting a high moldability and a high dimensional stability, and a high performance polymer electrolyte fuel cell using the fuel cell separators, which is capable of ensuring a stable output without reduction in output during operation of the fuel cell, thereby improving the operational efficiency thereof.

A fuel cell, particularly, a polymer electrolyte fuel cell is configured as a cell stack composed of an array of unit cells of the number of several tens to several hundreds, wherein each of the unit cells includes, as shown in FIG. 1, a pair of fuel cell separators 1 each having on its right and left side surfaces a plurality of ribs 1a, and a polymer electrolyte membrane 2 and two gas diffusion electrodes 3 interposed between these separators 1.

As shown in FIG. 2, the fuel cell separator 1 has a unique shape having the plurality of ribs 1a projecting from the right and left side surfaces of a thin plate-like body, wherein passages (grooves) 4 for supplying and discharging a fuel gas such as hydrogen or oxygen are formed between the ribs 1a on each side of the separator 1 and the corresponding electrode 3. Accordingly, the separator 1 is required to have a high elasticity, an excellent dimensional accuracy, and a desirable gas non-permeability, and also the unit cell (fuel cell) is required to have a high gas sealing characteristic capable of preventing a leak of a fuel gas, and an excellent impact resistance, particularly, when the fuel cell is used as a movable power source for automobiles, etc.

Such a fuel cell separator has been produced, for example, by a method (1) of kneading a carbon powder as a raw material with a phenol resin as a binder, molding and sintering the mixture, and carbonizing and graphitizing the sintered mixture (disclosed, for example, in Japanese Patent Laid-open No. Hei 8-222241), and a method (2) of molding a composition containing graphite and a binder such as a phenol resin.

By the way, since a voltage outputted from each unit cell of a fuel cell is low, the fuel cell must be composed of an array of unit cells of the number of several tens to several hundreds for ensuring a practical output (<several hundreds kW). Accordingly, to uniformly align the unit cells, fuel cell separators used therefor, each having a uniform shape with no deformation and no partial unevenness in thickness, have been required to be produced with a high dimensional accuracy and a high moldability.

The above-described method (1), however, has a problem that since a graphite block is produced by carbonization and graphitization and is then formed into a separator having a desired shape by machining, the production steps are complicated and the production cost is raised, and also it is difficult to obtain a uniform separator having a high dimensional accuracy.

The above-described method (2) has also a problem that since the fuel cell separator is produced by using novolak type phenol as a phenol resin and hexamine as a hardening agent, ions and organic matters such as free phenol, formalin, ammonia, hexamine as the hardening agent are eluted from the fuel cell separator due to water produced during operation of the fuel cell, so that the electric conductivity of the produced water is raised, to lower the output the fuel cell, thereby degrading the operational efficiency of the fuel cell.

SUMMARY OF THE INVENTION

An object of the present invention is to provide a high quality fuel cell separator capable of reducing elution of ions and organic matters and exhibiting a high moldability and a high dimensional stability, and a polymer electrolyte fuel cell using the above fuel cell separators as part or all of separators in the fuel cell, which cell is capable of ensuring a stable output after a long-term operation and a high operational efficiency and which is particularly suitable as a movable power source for automobiles, small-sized marine vessels, etc.

To achieve the above object, the present inventor has made studies of improvement of a fuel cell separator molded from a fuel cell separator composition mainly containing a conductive material and a binder, and has found that the elution of ions and organic matters from the separator due to water produced during operation of a fuel cell using the separator can be significantly reduced by using, as the binder, a phenol resin composed of a mixture of novolak type phenol and resol type phenol.

The reason why the use of the mixture of novolak type phenol and resol type phenol as the binder of the fuel cell separator composition mainly containing a conductive material and a binder is effective to prevent the elution of ions and organic matters from the separator due to water produced during operation of the fuel cell, is that the resol phenol acts as a hardening agent for the novolak type phenol, and since the novolak type phenol is hardened by condensation reaction, ammonia does not occur during the reaction unlike the case of using hexamine as a hardening agent for the novolak type phenol, and that the elution of ions and organic matters from the resol type phenol is very small as compared with the novolak type phenol.

The present inventor has eventually found that the fuel cell separator molded from a composition using, as a binder, the mixture of resol type phenol and novolak type phenol is effective to suppress the elution of ions and organic matters such as free phenol, formalin, ammonia and resol type phenol as a hardening agent as much as possible, and more specifically, reduce the elution degree, expressed by the electric conductivity, to 50 $\mu$S/cm or less, and also to enhance the dimensional accuracy and moldability and ensure a uniform quality. It is to be noted that the elution degree, expressed by the electric conductivity, is evaluated by putting 3.5 g of a test piece cut from the separator in 305 mL of pure water, heating the water at 90° C. for 500 hr, and measuring the electric conductivity of the water. On the basis of the above knowledge, the present invention has been accomplished.

Further, the present inventor has found that a polymer electrolyte fuel cell using the above-described fuel cell separators, each of which is capable of reducing the elution of ions and organic matters and exhibiting a high moldability and a high dimensional stability, as part or all of separators in the fuel cell is effective to suppress the reduction in output after long-term operation and exhibit a high operational efficiency, and is particularly suitable as a movable power source for automobiles, small-sized marine vessels, etc.

According to a first aspect of the present invention, there is provided a fuel cell separator molded from a fuel cell separator composition mainly containing a conductive material and a binder, characterized in the separator is specified such that after 3.5 g of a test piece cut from the fuel cell separator is put in 305 mL of pure water and the water is heated at 90° C. for 500 hr, an electric conductivity of the water is 50 $\mu$S/cm or less.

According to a second aspect of the present invention, there is provided a fuel cell separator molded from a fuel cell separator composition mainly containing a conductive material and a binder, characterized in that the binder comprises a phenol resin obtained by adding 20 to 100 wt % of resol type phenol to novolak type phenol.

In the above separator, preferably, 50 parts by mass or less of the binder is added to 100 parts by mass of the conductive material, and more preferably, the separator is specified such that after 3.5 g of a test piece cut from the fuel cell separator is put in 305 mL of pure water and the water is heated at 90° C. for 500 hr, an electric conductivity of the water is 50 $\mu$S/cm or less.

According to a third aspect of the present invention, there is provided a polymer electrolyte fuel cell composed of an array of a plurality of unit cells, each of which includes a pair of electrodes with a polymer electrolyte membrane put therebetween and a pair of separators having gas supplying/discharging passages with the electrodes put therebetween, characterized in that each of part or all of the separators of the fuel cell is molded from a fuel cell separator composition mainly containing a conductive material and a binder; and the separator is specified such that after 3.5 g of a test piece cut from the fuel cell separator is put in 305 mL of pure water and the water is heated at 90° C. for 500 hr, an electric conductivity of the water is 50 $\mu$S/cm or less.

According to a fourth aspect of the present invention, there is provided a polymer electrolyte fuel cell composed of an array of a plurality of unit cells, each of which includes a pair of electrodes with a polymer electrolyte membrane put therebetween and a pair of separators having gas supplying/discharging passages with the electrodes put therebetween, characterized in that each of part or all of the separators of the fuel cell is molded from a fuel cell separator composition mainly containing a conductive material and a binder; and the binder of the separator comprises a phenol resin obtained by adding 20 to 100 wt % of resol type phenol to novolak type phenol.

In the above polymer electrolyte fuel cell, preferably, 50 parts by mass or less of the binder is added to 100 parts by mass of the conductive material, and more preferably, the separator is specified such that after 3.5 g of a test piece cut from the fuel cell separator is put in 305 mL of pure water and the water is heated at 90° C. for 500 hr, an electric conductivity of the water is 50 $\mu$S/cm or less.

BRIEF DESCRIPTION OF THE DRAWINGS

FIG. 3 is a graph showing a relationship between a soaking time and an electric conductivity.

DETAILED DESCRIPTION OF THE PREFERRED EMBODIMENT

Figure 1:
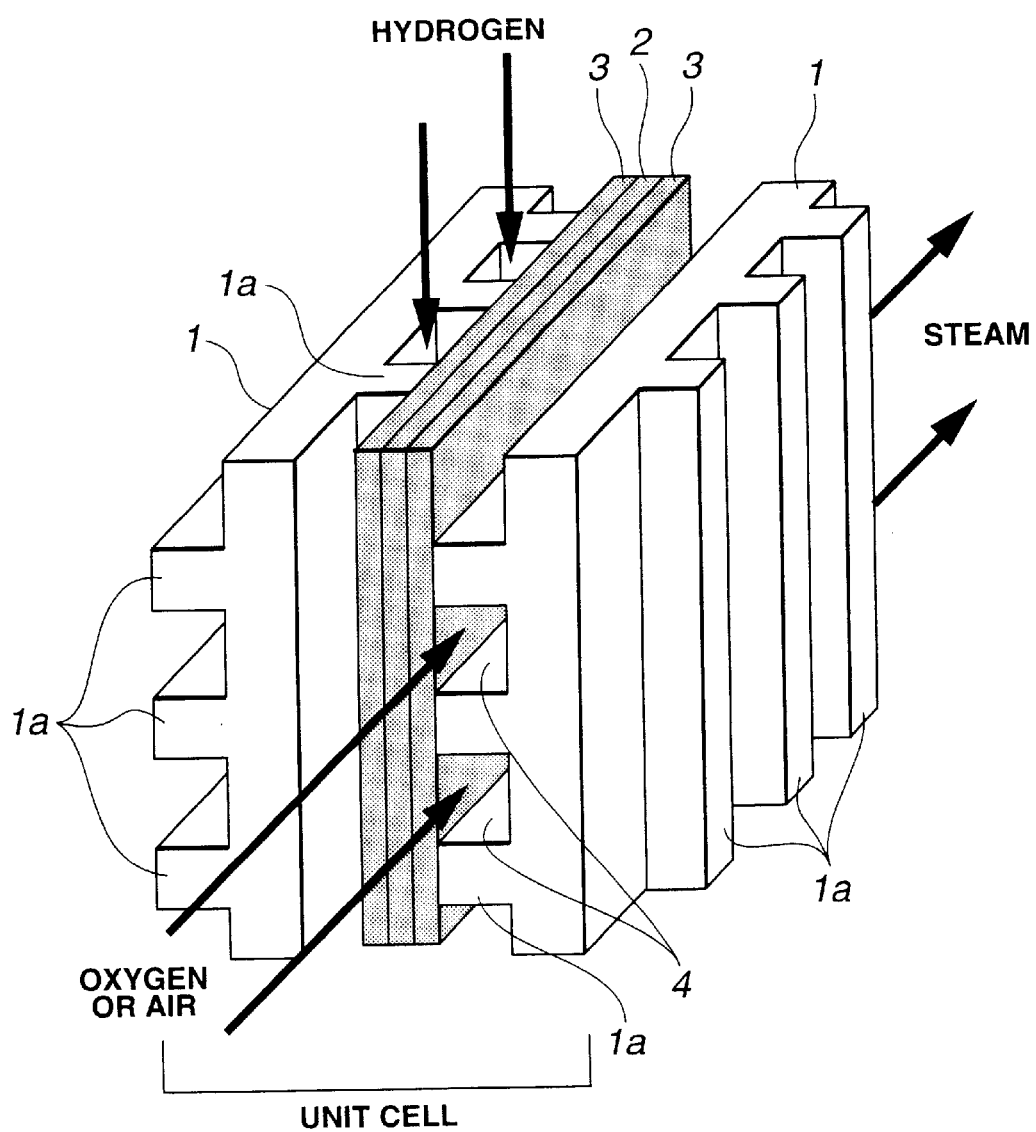
FIG. 1 is a perspective view of one example of a fuel cell.

Hereinafter, one embodiment of the present invention will be described in detail with reference to the drawings.

The present invention provides a fuel cell separator molded from a fuel cell separator composition mainly containing a conductive material and a binder, characterized in that the separator is specified such that after 3.5 g of a test piece cut from the fuel cell separator is put in 305 mL of pure water and the water is heated at 90° C. for 500 hr, an electric conductivity of the water is 50 $\mu$S/cm or less. With this configuration, it is possible to reduce the elution of ions and organic matters from the fuel cell separator and to enhance the moldability and dimensional stability of the fuel cell separator.

The electric conductivity of water, which is required to be in a range of 50 $\mu$S/cm or less, is preferably in a range of 30 $\mu$S/cm or less, more preferably, 20 $\mu$S/cm or less, most preferably, 15 $\mu$S/cm or less. If the electric conductivity of water is larger than 50 $\mu$S/cm, the output of a fuel cell using the above separators is lowered and the operational efficiency thereof is degraded, with a result that it fails to achieve the object, function, and effect of the present invention. In addition, the lower limit of the electric conductivity of water is not particularly restricted but is preferably set to 2 $\mu$S/cm or more.

Such a fuel cell separator is molded from a fuel cell separator composition mainly containing a conductive material (A) and a binder (B).

Specific examples of the conductive materials (A) may include carbon black, ketchen black, acetylene black, carbon whiskers, graphite, amorphous carbon, metal fibers, and powders of titanium oxide, ruthenium oxide. These materials may be used singly or in combination. In particular, graphite is preferably used as the conductive material (A).

Graphite may be natural graphite or artificial graphite, and may be graphite having any shape such as flake graphite, massive graphite, expandable graphite, expanded graphite, or kish graphite. The average particle size of graphite is preferably in a range of 5 to 80 $\mu$m, more preferably, in a range of 20 to 60 $\mu$m.

As the binder (B), there is used a phenol resin composed of a mixture of novolak type phenol and resol type phenol. The added amount of the resol type phenol to the novolak type phenol may be in a range of 20 to 100 wt %, preferably, 30 to 90 wt %, more preferably, 30 to 75 wt %. If the added amount of the resol type phenol is out of the above range, the eluted amount of ions and organic matters is increased, whereby the electric conductivity is increased.

The added amount of the binder (B) may be in a range of 50 parts by mass or less, preferably, 5 to 50 parts by mass, more preferably, 10 to 35 parts by mass, and most preferably, 15 to 30 parts by mass on the basis of 100 parts by mass of the conductive material (A). If the added amount of the binder (B) is smaller than 5 parts by mass, the strength of the separator is lowered and thereby the gas permeability thereof is increased. On the other hand, if the added amount is larger than 50 parts by mass, since the content of the conductive material is correspondingly decreased, the electric conductivity is degraded, thereby failing to achieve the object of the present invention.

The binder (B) is preferably used in the form of a mixture with a solvent. Specific examples of the solvents may include an alcohol based solvent such as methanol, ethanol, butanol, or isopropyl alcohol; a ketone based solvent such as acetone, methyl ethyl ketone, methyl isobutyl ketone; a glycol based solvent such as ethylene glycol or diethylene glycol; a furan based solvent such as furan, furfural, furfuryl alcohol; and others such as water, toluene, and methylene chloride. These solvents may be used singly or in combination. In particular, a mixed solvent containing water and methanol or acetone at a mixing weight ratio of (water: methanol or acetone=1:99 to 99:1). The added amount of the solvent may be in a range of 20 parts by mass or less, preferably, 0 to 20 parts by mass, more preferably, 0 to 15 parts by mass on the basis of 100 parts by mass of the conductive material (A).

The fuel cell separator composition according to the present invention may further contain an additive as needed, in addition to the above-described components (A) and (B). Specific examples of the additives may include a lubricant such as zinc stearate or stearic acid, a plasticizer, a mold releasing agent, a stabilizer, an oxidation inhibitor, a hydrolysis resisting agent, a fiber base material, and a metal powder.

Specific examples of the fiber based materials may include inorganic fibers such as metal fibers of iron, copper, brass, bronze, aluminum, etc., ceramic fibers, fibers of potassium titanate, glass fibers, carbon fibers, rock wool, wollastonite, sepiolite, attapulgite, and artificial mineral fibers; and organic fibers such as aramid fibers, polyimide fibers, polyamide fibers, phenol fibers, cellulose, and acrylic fibers. These fiber base materials may be used singly or in combination. The added amount of the fiber based material may be in a range of 0 to 10 parts by mass on the basis of 100 parts by mass of the conductive material (A).

The fuel cell separator according to the present invention is produced by mixing raw materials of the fuel cell separator composition mainly containing the above-described components (A) and (B) to obtain a compound; packing the compound in a mold for separator, having a complicated groove shape; hot-press molding the compound at a temperature of 150 to 160° C. at a pressure of 10 to 50 MPa for 5 to 10 min; and heat-treating the molded body at a temperature of 130 to 200° C. for 0 to 72 hr.

The fuel cell separator according to the present invention thus obtained is specified such that the gas permeability, measured in accordance with a method B under JIS K7126, is in a range of 30 mL/m$^2$·24 hr·atm or less, preferably, 2 to 20 mL/m$^2$·24 hr·atm, more preferably, 2 to 10 mL/m$^2$·24 hr·atm. If the gas permeability is larger than 30 mL m$^2$·24 hr·atm, a leak of a fuel gas may occur at the time of assembling a fuel cell including the separators, thereby failing to achieve the object, function, and effect of the present invention.

The fuel cell separator of the present invention thus obtained is also specified such that the resistivity, measured in accordance with a four probe method of the resistivity measurement for a silicon single crystal and a silicon wafer under JIS H0602, may be 30 mΩ·cm or less, preferably, 20 mΩ·cm, more preferably, 2 to 20 mΩ·cm.

The fuel cell separator of the present invention thus obtained is further specified such that the flexural strength, measured in accordance with a method under JIS K6911, is in a range of 20 to 80 MPa, more preferably, 30 to 60 MPa; the flexural modulus, measured in accordance with a method under JIS K6911, is in a range of 3 to 60 GPa, preferably, 10 to 55 GPa; and the deformation, measured in accordance with a method under JIS K6911 is in a range of 0.1 to 2 mm, preferably, 0.5 to 1.5 mm.

According to the present invention, there is further provided a polymer electrolyte fuel cell composed of an array of a plurality of unit cells, each of which includes a pair of electrodes with a polymer electrolyte membrane put therebetween and a pair of separators having gas supplying/discharging passages with the electrodes put therebetween, wherein the above-described fuel cell separators are used as separators of the units cells of the fuel cell.

According to the polymer electrolyte fuel cell of the present invention, all of the separators in the fuel cell are not necessarily configured as the above-described fuel cell separators of the present invention, but part of the separators in the fuel cell may be configured as the above-described fuel cell separators of the present invention. To be more specific, 50% or more, preferably, 50 to 100%, more preferably, 70 to 100%, most preferably, 80 to 100% of the total separators in the fuel cell may be configured as the fuel cell separators of the present invention. If the ratio of the number of the fuel cell separators of the present invention on the basis of the total number of the separators in the fuel cell is less than 50%, the output of the fuel cell may be lowered after long-term operation thereof, thereby failing to achieve the object, function, and effect of the present invention. Additionally, as the separators other than the fuel cell separators of the present invention, there can be used separators generally used for a fuel cell.

As the above-described polymer electrolyte membrane, there may be used a polymer electrolyte membrane generally used for a polymer electrolyte fuel cell, for example, a proton conductive ion exchange membrane formed by a fluorine based resin, which is represented by a film of poly(trifluorostyrene sulfonic acid) or a film of poly (perfluorocarbon sulfonic acid) sold under the trade name of Nafion. The surface of the electrolyte membrane is coated with a catalytic paste. The paste is obtained by preparing a carbon powder supporting a catalyst such as platinum or a platinum alloy containing another metal, and dispersing the resultant carbon powder in an organic solvent such as a mixed solution (trade name: Nafion117 solution) of lower fatty acid group alcohol containing perfluorocarbon sulfonic acid and water.

Each of a pair of the above-described electrodes disposed with the polymer electrolyte membrane put therebetween can be formed of a carbon paper, a carbon felt, or a carbon cloth of woven carbon fibers.

The electrolyte membrane is integrated with the pair of electrodes by interposing the electrolyte membrane between the pair of electrodes and bonding them by thermo-compression at a temperature of 120 to 130° C., or by bonding the electrolyte membrane to the pair of electrodes by using an adhesive.

The electrodes in which the electrolyte membrane has been integrally interposed are mounted between a pair of the separators in such a manner that passages for supplying and discharging fuel gases are formed between the separators and the electrodes, to thus obtain a unit cell. In this case, the electrodes may be fixedly mounted between the separators by coating the end surfaces, to be in contact with the electrodes, of the ribs of the separators with an adhesive and bonding the electrodes to the ribs of the separators.

The polymer electrolyte fuel cell of the present invention, in which the fuel cell separators of the present invention are used as part (preferably, 50% or more) or all of the total separators in the fuel cell, is capable of exhibiting a stable output after long-term operation and a high operational efficiency, and is particularly suitable as a movable power source for automobiles, small-sized marine vessels, etc.

To be more specific, the output of the polymer electrolyte fuel cell of the present invention after continuous operation thereof for 500 to 1000 hr is 90% or more, preferably, 95 to 100% of the initial output thereof. That is to say, the polymer electrolyte fuel cell of the present invention can suppress the reduction in output for a long-period of time.

It is to be noted that the polymer electrolyte fuel cell of the present invention can be used, in addition to a movable power source for automobiles, small-sized marine vessels, etc., widely in various applications such as a small scale area power plant, a household power generator, a simple power source for a camp site, a power source for artificial satellites, and a power source for space development.

According to the present invention, it is possible to provide a high quality fuel cell separator capable of reducing elution of ions and organic matters and exhibiting a high moldability and a high dimensional stability, and to provide a polymer electrolyte fuel cell using the above fuel cell separators as part or all of separators in the fuel cell, which cell is capable of ensuring a stable output with less reduction in output after a long-term operation and a high operational efficiency.

EXAMPLES

The present invention will be more clearly understood by way of, while not limited thereto, the following examples:

Inventive Examples 1 to 5, Comparative Examples 1 to 3

Figure 2:
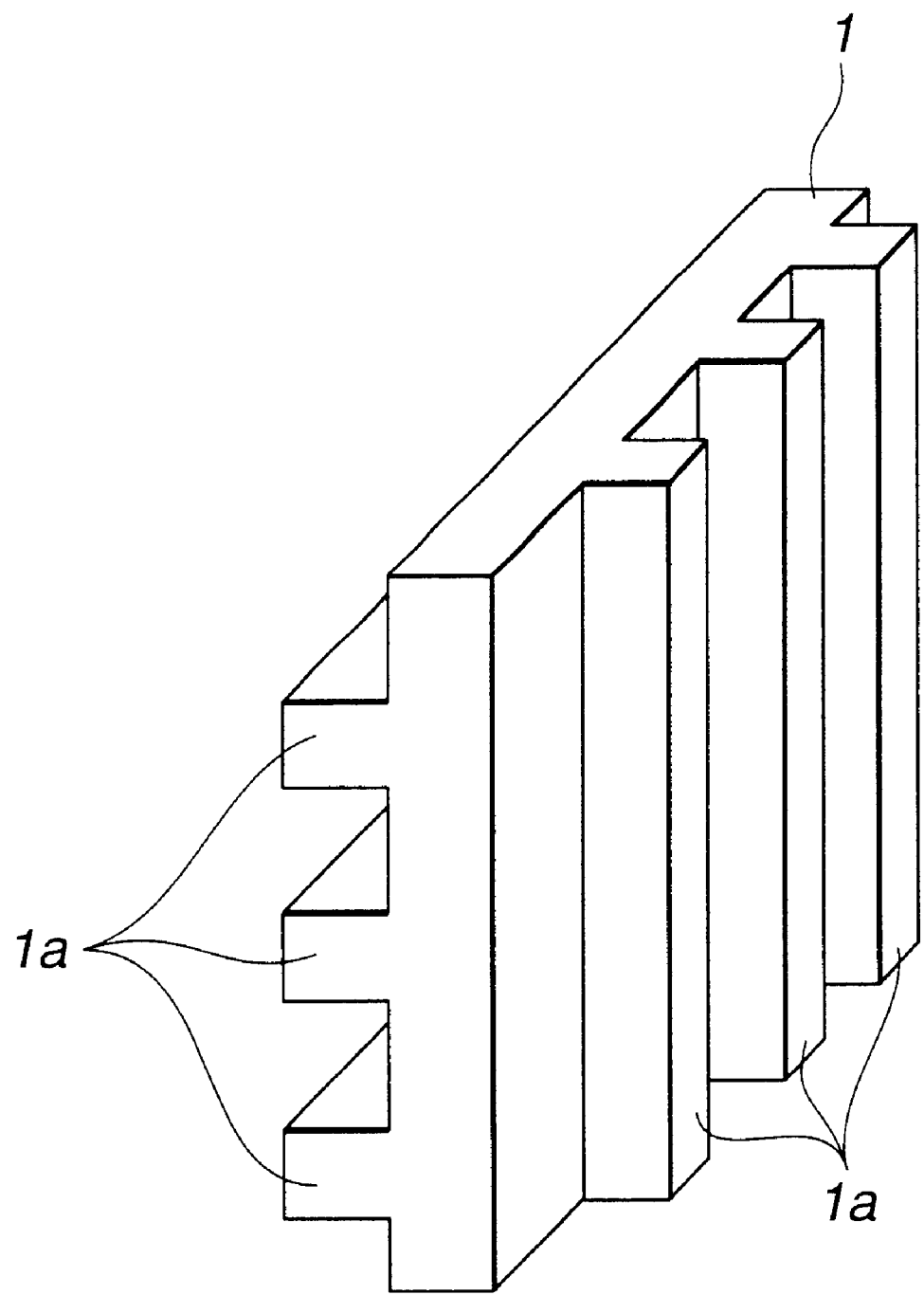
FIG. 2 is a perspective view of a fuel cell separator according to one embodiment of the present invention.

A compound was obtained by mixing graphite, novolak type phenol, resol type phenol, and hexamine at each mixing ratio shown in Table 1. The compound was packed in a mold for molding a separator, and was hot-press molded at 150° C. and 19.6 Mpa for 5 min, to produce a fuel cell separator having a size of 100 mm (length)×100 mm (width)×2.0 mm (thickness) and having a shape provided with ribs on right and left sides as shown in FIG. 2. In this way, fuel cell separators in Inventive Examples 1 to 5 and Comparative Examples 1 and 2 were prepared. In addition, the fuel cell separator in Comparative Example 3 was obtained by machining a graphite block produced by sintering for graphitization.

TABLE 1

| Components (parts by mass) | Inventive Examples | | | | | Comparative Examples | | |
|---|---|---|---|---|---|---|---|---|
| | 1 | 2 | 3 | 4 | 5 | 1 | 2 | 3 |
| Graphite (artificial graphite, ave. 30 μm) | 100 | 100 | 100 | 100 | 100 | 100 | 100 | Mechined graphite |
| Novolak type phenol | — | 7 | 8 | 11.5 | 16 | 21 | 23 | |
| Resol type phenol | 23 | 16 | 20 | 11.5 | 7 | 2 | — | |
| Hexamine | — | — | — | — | — | — | 3 | |

Each of the fuel cell separator thus obtained was evaluated in terms of electric conductivity, moldability, dimensional stability, and gas permeability in accordance with the following manners.

Measurement of Electric Conductivity

A test piece of 3.5 g cut from each fuel cell separator was put in 305 mL of pure water and the water was heated at 90° C., and the electric conductivity of the water was measured with time until an elapse of 500 hr.

Moldability

○: good
Δ: slightly poor
X: no good

Dimensional Stability

○: good
Δ: slightly poor
X: no good

Gas Permeability under method B in JIS K7126

The results are shown in Tables 2 and 3 and FIG. 3.

Next, the compound obtained by mixing the components at each mixing ratio shown in Table 1 was packed in a mold, and hot-press molded at 150° C. and 19.6 MPa for 5 min, to prepare a test piece having a size of 100 mm×10 mm×4 mm. The flexural strength, flexural modulus, and deformation of the test piece were measured with a supporting point-to-supporting point distance set to 80 mm in accordance with a general testing method for a thermosetting plastic under JIS K6911. Further, the resistivity of the test piece was measured in accordance with the above-described four probe method of the resistivity measurement for a silicon single crystal and a silicon wafer under JIS H0602. In addition, the test piece in Comparative Example 3 was prepared by machining a graphite block produced by sintering for graphitization into a size of 100 mm×10 mm×4 mm. The results are shown in Table 3.

TABLE 2

| | Soaking time | | | | | | | | |
|---|---|---|---|---|---|---|---|---|---|
| | 0 | 22 | 89 | 132 | 175 | 242 | 333 | 500 | |
| Inventive Example 1 | 1.0 | 2.0 | 3.3 | 3.7 | 4.3 | 5.6 | 7.1 | 9.4 | Electric conductivity (μS/cm) |
| Inventive Example 2 | 0.9 | 1.5 | 2.2 | 2.3 | 2.6 | 3.4 | 3.8 | 4.4 | |
| Inventive Example 3 | 1.3 | 1.8 | 2.3 | 2.4 | 2.6 | 3.3 | 3.6 | 4.4 | |
| Inventive Example 4 | 1.0 | 2.1 | 2.5 | 4.2 | 5.3 | 6.7 | 8.2 | 10.5 | |
| Inventive Example 5 | 1.0 | 4.3 | 6.3 | 7.4 | 9.4 | 12.3 | 14.5 | 18.5 | |
| Comparative Example 1 | 0.9 | 10.5 | 20.4 | 31.2 | 40.3 | 50.2 | 64.3 | 70.4 | |

TABLE 2-continued

| | Soaking time | | | | | | | |
|---|---|---|---|---|---|---|---|---|
| | 0 | 22 | 89 | 132 | 175 | 242 | 333 | 500 |
| Comparative Example 2 | 0.6 | 13.8 | 27.6 | 43.3 | 53.8 | 63.9 | 90.1 | 106 |
| Comparative Example 3 | 1.1 | 1.6 | 1.6 | 1.8 | 1.9 | 2.2 | 2.3 | 2.7 |

TABLE 3

| | Inventive Examples | | | | | Comparative Examples | | |
|---|---|---|---|---|---|---|---|---|
| | 1 | 2 | 3 | 4 | 5 | 1 | 2 | 3 |
| Flexural strength (MPa) | 53 | 53 | 59 | 50 | 47 | 42 | 40 | 60 |
| Flexural modulus (GPa) | 40 | 18 | 21 | 25 | 30 | 40 | 40 | 25 |
| Deformation (mm) | 0.6 | 1.1 | 0.9 | 0.7 | 0.7 | 0.5 | 0.5 | 1.0 |
| Resistivity (mΩ · cm) | 7 | 12 | 13 | 16 | 20 | 26 | 25 | 5 |
| Moldability | ○ | ○ | ○ | ○ | ○ | X | X | — |
| Dimensional stability | ○ | ○ | ○ | ○ | ○ | Δ | Δ | — |
| Gas permeability (mL/m² · 24 hr · atm) | 10 | 4 | 4 | 7 | 10 | 30 | 41 | 20 |

As shown in FIG. 3, the electric conductivity in the fuel cell separator in each of Inventive Examples 1, 3 and 4 is increased with elapsed time; however, the increased degree of the electric conductivity is very smaller than that in each of the fuel cell separator in Comparative Example 2 in which hexamine is used as a hardening agent for novolak type phenol and the fuel cell separator in Comparative Example 1 which contains a large amount of novolak type phenol. In addition, although the electric conductivity in the fuel cell separator in Comparative Example 3, in which the separator was produced by machining a graphite block produced by sintering for carbonization, is little increased with elapsed time; however, such a separator must be produced in the sintering step for carbonizing which is complicated and is required to have expensive production equipment and is thereby poor in productivity and economic merit, and must be formed by machining and is thereby poor in dimensional accuracy, and therefore, the separator is unsuitable as the fuel cell separator.

Further, as shown in Table 3, the fuel cell separator in each of Inventive Examples 1 to 5 was good in moldability, dimensional stability, and gas permeability as compared with the fuel cell separator in each of Comparative Examples 1 to 3.

Inventive Example 6

Polymer Electrolyte Fuel Cell (1)

A polymer electrolyte membrane (trade name: Nafion) was put between a pair of electrodes formed by a carbon paper (sold by Kemix Co., Ltd.), and was bonded thereto in a general method, to prepare an integral electrode body. The integral electrode body was put between a pair of the fuel cell separators prepared in Inventive Example 1, to obtain a unit cell having fuel gas supplying/discharging passages. Then, 50 pieces of the unit cells were aligned and fastened to each other with bolts and nuts, to obtain a fuel cell.

The fuel cell was proved to allow charging/discharging and to exhibit an effective function as a fuel cell.

As a result of continuous operation of the fuel cell for 500 hr, it was confirmed that the reduction ratio of the output with time to the initial output was 10% or less, that is, the output of the fuel cell was little changed with elapsed time.

Inventive Example 7

Polymer Electrolyte Fuel Cell (2)

A polymer electrolyte membrane (trade name: Nafion) was put between a pair of electrodes formed by a carbon paper (sold by Kemix Co., Ltd.), and was bonded thereto in a general method, to prepare an integral electrode body. The integral electrode body was put between a pair of the fuel cell separators prepared in Inventive Example 2, to obtain a unit cell having fuel gas supplying/discharging passages. Then, 100 pieces of the unit cells were aligned and fastened to each other with bolts and nuts, to obtain a fuel cell.

The fuel cell was proved to allow charging/discharging and to exhibit an effective function as a fuel cell.

As a result of continuous operation of the fuel cell for 500 hr, it was confirmed that the reduction ratio of the output with time to the initial output was 10% or less, that is, the output of the fuel cell was little changed with elapsed time.

Comparative Example 4

Polymer Electrolyte Fuel Cell (3)

A polymer electrolyte membrane (trade name: Nafion) was put between a pair of electrodes formed by a carbon paper (sold by Kemix Co., Ltd.), and was bonded thereto in a general method, to prepare an integral electrode body. The integral electrode body was put between a pair of the fuel cell separators prepared in Comparative Example 1, to obtain a unit cell having fuel gas supplying/discharging passages. Then, 100 pieces of the unit cells were aligned and fastened to each other with bolts and nuts, to obtain a fuel cell.

The fuel cell proved to allow charging/discharging and to exhibit an effective function as a fuel cell.

As a result of continuous operation of the fuel cell for 500 hr, it was confirmed that the reduction ratio of the output with time to the initial output was 50%.

While the preferred embodiment of the present invention has been described using the specific terms, such description is for illustrative purposes only, and it is to be noted that changes and variations may be made without departing from the spirit or scope of the following claims.

What is claimed is:

1. In a fuel cell separator molded from a fuel cell separator composition mainly containing a conductive material and a binder, the improvement wherein
said separator is specified such that after 3.5 g of a test piece cut from said fuel cell separator is put in 305 mL of pure water and the water is heated at 90° C. for 500 hr, an electric conductivity of the water is 50 µS/cm or less.

2. In a fuel cell separator molded from a fuel cell separator composition mainly containing a conductive material and a binder, the improvement wherein said binder comprises a phenol resin obtained by adding 20 to 100 wt % of resol type phenol to novolak type phenol.

3. A fuel cell separator according to claim 2, wherein 50 parts by mass or less of said binder is added to 100 parts by mass of said conductive material.

4. A fuel cell separator according to claim 2 or 3, wherein said separator is specified such that after 3.5 g of a test piece cut from said fuel cell separator is put in 305 mL of pure water and the water is heated at 90° C. for 500 hr, an electric conductivity of the water is 50 µS/cm or less.

5. In a polymer electrolyte fuel cell composed of an array of a plurality of unit cells each of which includes a pair of electrodes with a polymer electrolyte membrane put therebetween and a pair of separators having gas supplying/discharging passages with said electrodes put therebetween, the improvement wherein each of part or all of said separators of said fuel cell is molded from a fuel cell separator composition mainly containing a conductive material and a binder; and said separator is specified such that after 3.5 g of a test piece cut from said fuel cell separator is put in 305 mL of pure water and the water is heated at 90° C. for 500 hr, an electric conductivity of the water is 50 µS/cm or less.

6. In a polymer electrolyte fuel cell composed of an array of a plurality of unit cells each of which includes a pair of electrodes with a polymer electrolyte membrane put therebetween and a pair of separators having gas supplying/discharging passages with said electrodes put therebetween, the improvement wherein each of part or all of said separators of said fuel cell is molded from a fuel cell separator composition mainly containing a conductive material and a binder; and said binder of said separator comprises a phenol resin obtained by adding 20 to 100 wt % of resol type phenol to novolak type phenol.

7. A polymer electrolyte fuel cell according to claim 6, wherein 50 parts by mass or less of said binder is added to 100 parts by mass of said conductive material.

8. A polymer electrolyte fuel cell according to claim 6 or 7, wherein said separator is specified such that after 3.5 g of a test piece cut from said fuel cell separator is put in 305 mL of pure water and the water is heated at 90° C. for 500 hr, an electric conductivity of the water is 50 µS/cm or less.

* * * * *